United States Patent [19]

Dooley et al.

[11] Patent Number: 5,108,821
[45] Date of Patent: Apr. 28, 1992

[54] SELF-EXTINGUISHING BLANKET ENCLOSED WITH PLASTIC FILMS

[75] Inventors: Michael J. Dooley; Eugene F. Lopez, both of Sunnyvale; Robert T. Zajdel, San Jose, all of Calif.

[73] Assignee: Orcon Corporation, Union City, Calif.

[21] Appl. No.: 477,269

[22] Filed: Feb. 7, 1990

[51] Int. Cl.$^5$ .............................. B32B 7/14; A62C 2/06
[52] U.S. Cl. ...................................... 428/198; 428/74; 428/76; 428/109; 428/110; 428/113; 428/114; 428/200; 428/201; 428/210; 428/247; 428/228; 428/251; 428/252; 428/261; 428/268; 428/292; 428/294; 428/295; 428/296; 428/430; 428/441; 428/920; 428/921; 428/910; 428/902
[58] Field of Search .................. 428/74, 76, 109, 110, 428/113, 114, 200, 201, 210, 247, 228, 251, 252, 261, 268, 292, 294, 295, 296, 430, 441, 198, 920, 921, 910, 902

[56] References Cited

U.S. PATENT DOCUMENTS

| | | |
|---|---|---|
| 3,707,433 | 12/1972 | Clough et al. |
| 3,837,138 | 9/1974 | Terry |
| 4,058,643 | 11/1977 | Marshall et al. ............... 428/920 X |
| 4,164,605 | 8/1979 | Okawa et al. |
| 4,170,675 | 10/1979 | Greengrass |
| 4,232,620 | 11/1980 | Kurz |
| 4,291,851 | 9/1981 | Johnson |
| 4,374,888 | 2/1983 | Bornslaeger |
| 4,386,128 | 5/1983 | Yoshikawa |
| 4,880,680 | 11/1989 | Kistner |
| 4,892,771 | 1/1990 | Rowland |
| 4,927,705 | 5/1990 | Syme et al. |

OTHER PUBLICATIONS

Yehaskel, "Fire and Flame Retardant Polymers Recent Developments", Noyes Data Corporation, 1979.

Primary Examiner—Patrick J. Ryan
Assistant Examiner—William P. Watkins, III
Attorney, Agent, or Firm—Donald C. Feix

[57] ABSTRACT

A self-extinguishing blanket comprises an insulating layer of glass fiber strands which include air spaces within the layer. Each surface of the layer has a bidirectional strand reinforced plastic film which extends continuously along the surface for keeping moisture out of the layer. Each plastic film is attached to the associated surface of the insulation layer by non-contiguous, longitudinally and laterally spaced apart areas of a thermoplastic adhesive. The adhesive areas provide attachment between the strand reinforcement and the layer of glass fiber strands. Each area of adhesive attachment provides sufficient retention to prevent shifting of the film during the sewing together of peripheral edge portions of the sandwiched plastic films and inner insulation layer as required to produce a selected, peripheral configuration of a blanket package. Each area of adhesive attachment is however small enough to permit ready detachment of the strand reinforcement and associated film from the layer of glass fiber strands upon exposure to the heat of a flame. Each plastic film has a composition and embodies a stress condition which enables a portion of the plastic film, when subjected to a direct flame or to the heat developed by an adjacent flame, to soften, to pull apart, and to shrink and curl back and to continue to curl back sufficiently far so as to prevent heating of that portion of the plastic film to the ignition temperature. This blanket construction leaves only the non-flammable layer of glass fiber strands exposed to the heat of the flame, and the shrinking and curl back of the plastic film prevent both ignition of the plastic film and propagation of the flame through the plastic film.

9 Claims, 3 Drawing Sheets

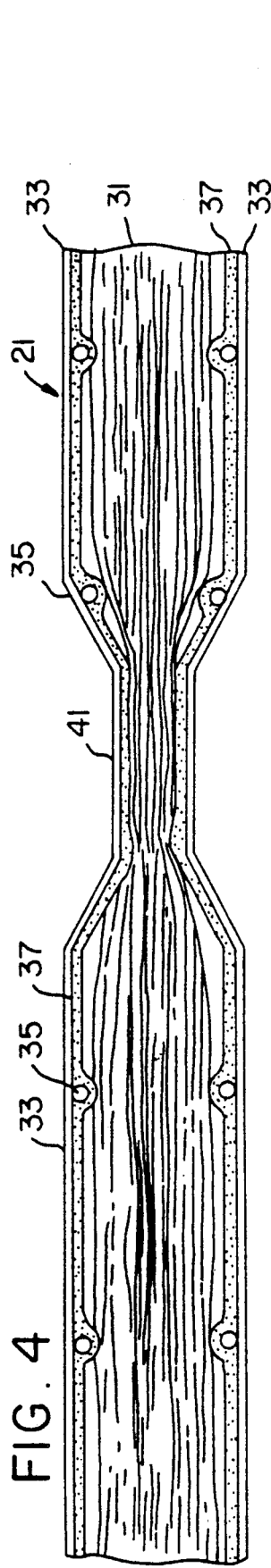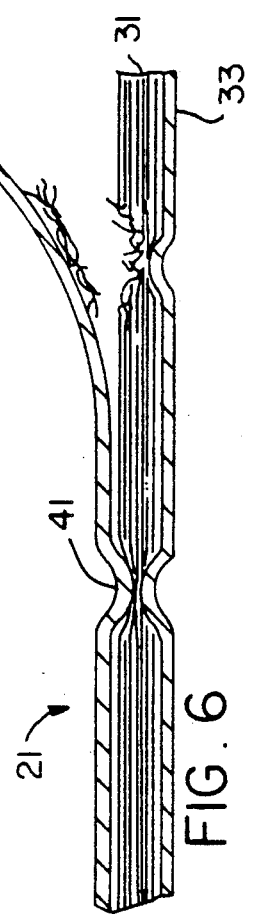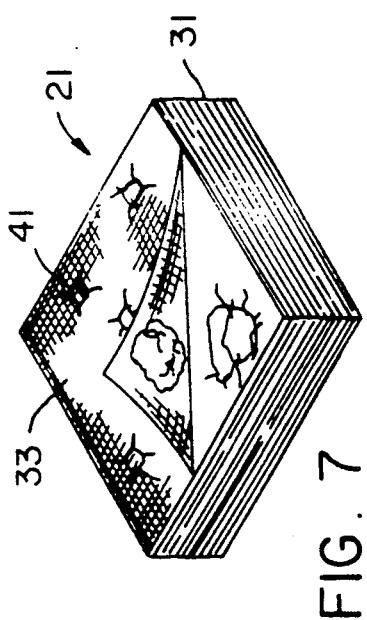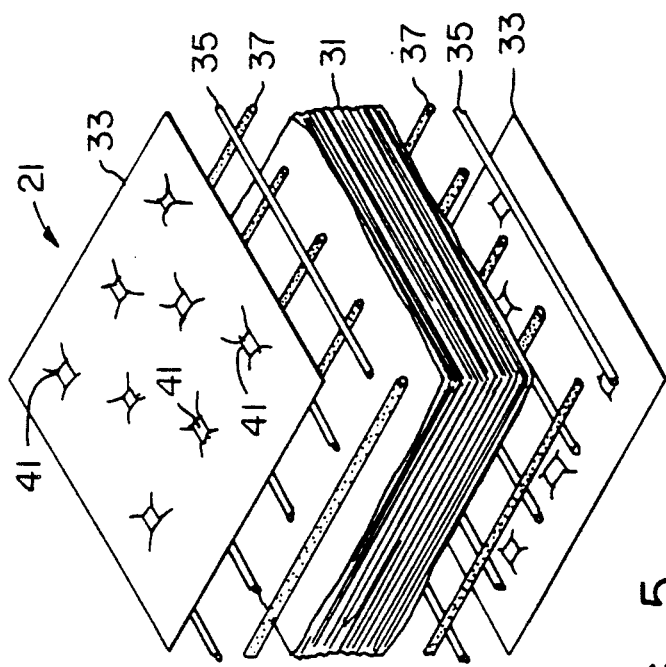
FIG. 4
FIG. 6
FIG. 7
FIG. 5

FIG. 8
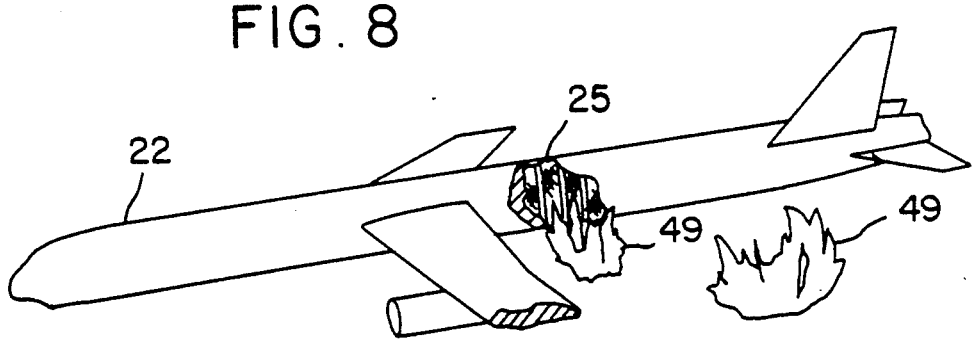
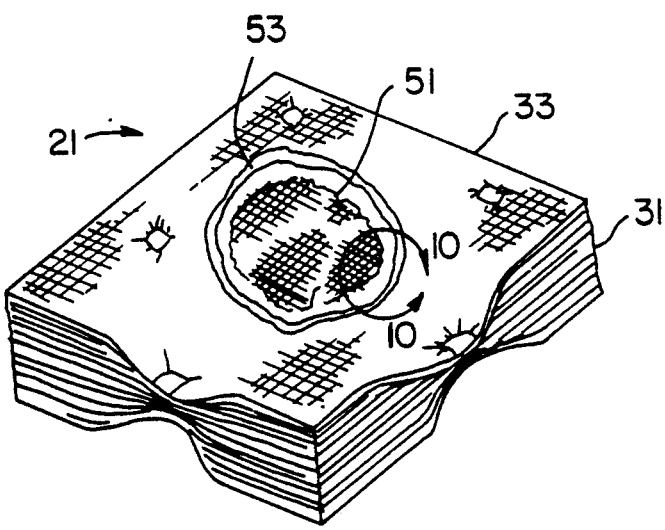
FIG. 9
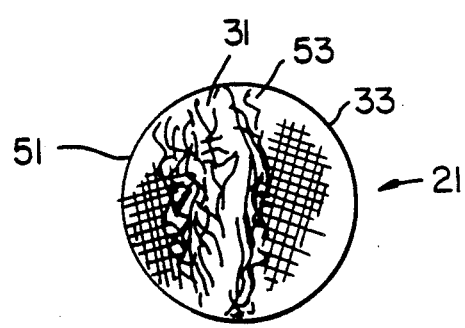
FIG. 10

SELF-EXTINGUISHING BLANKET ENCLOSED WITH PLASTIC FILMS

BACKGROUND OF THE INVENTION

This invention relates to a self-extinguishing blanket.

This invention relates particularly to a self-extinguishing blanket of the kind which is positioned between the inner and outer skin of the fuselage of an airliner. The self-extinguishing blanket incorporates a heat insulating layer of lass fiber strands sandwiched between two outer strand reinforced plastic films. The films serve primarily as moisture barriers for preventing entry of moisture into the dry air spaces of the insulating layer of glass fiber strands.

This invention relates particularly to a composition and construction of the self-extinguishing blanket which enables a portion of the plastic film, when subjected to a direct flame or to the heat developed by an adjacent flame, to soften, to pull apart and to shrink and curl back sufficiently far so as to prevent heating of that portion of the plastic film to the ignition temperature. This shrinking and curl back of the plastic film minimizes the chance of ignition of the plastic film and prevents propagation of the flame through the plastic film. The composition and construction provide a self-extinguishing blanket.

There are a number of applications requiring a self-extinguishing insulation blanket of the kind which will (1) provide insulation against heat transfer and (2) also provide resistance to rips or tears occurring during normal fabrication and/or installation and (3) also be self-extinguishing in the event of exposure to a direct flame or the heat from an adjacent flame.

An insulation blanket installed between the inner and outer skins of an airliner particularly requires a self-extinguishing blanket of this kind.

Because there is a large temperature gradient which must be maintained between the air temperature outside an airliner and the cabin temperature within the airliner, the insulation between the inner and outer skins of an airliner must provide a high degree of insulation against the transfer of heat between the inner and outer skins of the airliner. A layer of glass fiber strands is used as the main heat insulation component for such applications because the glass fiber strands provide air spaces between the strands. The air spaces are effective to provide a high degree of insulation against heat transfer so long as the air spaces are kept dry. Moisture condenses on the inside surface of the outside skin of an airliner. This condensed moisture can degrade the heat insulation qualities of the layer of glass fibers if the moisture and/or condensed moisture can find a way into the air spaces between the glass fiber strands.

Thin plastic films are used to cover and to sandwich the glass fiber strands between the films. The films serve as barriers to the entry of moisture into the insulating layer of glass fiber strands. The thickness of each film is kept as small as possible in order to minimize weight, and strand reinforcement is applied to the plastic film to add strength to the film. The strand reinforcement also limits the effects of punctures, tears or rips in the plastic film. Rips and tears occur during the sewing, or other connecting together, of peripheral edge portions as required to produce a pre-configured blanket package for fitting into a particular location on an airliner fuselage. Rips and tears can also occur during the actual installation of the blanket package into such locations on the airliner.

The plastic films must be adhered to the insulating layer to prevent shifting of the film laterally and longitudinally of the insulating layer during the fabrication (e.g. the sewing together of the peripheral edge portions) required to produce a pre-configured blanket package product for a specific location on the airliner.

The plastic films have been attached to the insulating layer by laminating and by stitching.

Laminating has included the use of a laminating adhesive which attaches the entire inner surface of the plastic film to the adjacent surface of the insulating layer of glass fiber strands.

The stitching has included stitching entirely through the sandwiched structure at certain lines or areas of the sandwiched structure.

These existing means of attachment have served the purpose of holding the plastic films in place during peripheral edge sewing or other connection as required for the manufacture of a selected, peripheral configuration of a blanket package product, but these means of attachment have presented problems in the event the blanket is subjected to a direct flame or to the heat of a closely adjacent flame as may occur in the event of a crash of the airliner and the spill of engine fuel as a result of the crash.

The laminating means of attachment have, in such events, functioned to hold the plastic film so firmly in place that the film itself catches on fire and propagates the flame by means of the fuel (the carbon and hydrogen composition) provided by the plastic film itself. The stitching means of attachment have allowed moisture to enter into the insulating layer of glass fiber strands by perforating the plastic film.

It is a primary object of the present invention to construct a self-extinguishing blanket with minimum or no perforation of the plastic film.

It is a related object of the present invention to construct a self-extinguishing blanket which avoids the problems of flammability present in prior art blanket constructions.

SUMMARY OF THE INVENTION

The self-extinguishing blanket of the present invention is a blanket which is specifically constructed for applications of the kind which the blanket must provide a high degree of heat insulation, must provide reasonable resistance to punctures, tears and rips resulting from fabrication and/or installation, must have minimum or no perforations of the plastic film, must be as lightweight as possible, and must be self-extinguishing in the event of exposure to a direct flame or to the heat resulting from an adjacent flame.

The self-extinguishing blanket of the present invention comprises a layer of glass fiber strands constructed to include air spaces within the layer for providing insulation against the transfer of heat across the layer. The layer has first and second outer surfaces on opposed sides of the layer.

A plastic film extends adjacent to and continuously along a related outer surface of the insulation layer for keeping moisture out of the layer.

Each film is attached to its associated outer surface of the insulation layer with sufficient retention to prevent shifting of the film laterally and longitudinally of the layer during the sewing together, or other connecting together, of peripheral edge portions of the sandwiched outer plastic films and inner insulation layer as required to produce a selected, peripheral configuration of a blanket package.

In a specific embodiment of the present invention each of the plastic films has a composition and embodies a stress condition which enables a portion of the plastic film, when subjected to a direct flame or to the heat developed by an adjacent flame, to soften, to pull apart, and to shrink and curl back and to continue to curl back sufficiently far so as to prevent heating of any part of the plastic film to the ignition temperature.

The means for attaching the plastic films to the insulation layer are sufficiently detachable to enable the shrinking and curling back of the plastic film to the extent required to avoid heating of the plastic film to the ignition temperature.

This construction and this shrinking and curling back leaves only the non-flammable layer of glass fiber strands exposed to the direct flame or to the heat developed by an adjacent flame.

The shrinking and curl back of the plastic film minimizes the chance of ignition of the plastic film and prevents propagation of the flame through the plastic film.

Self-extinguishing blanket constructions and methods as described above and which are effective to function as described above constitute further, specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric view of an airliner with a portion of the outer skin of the fuselage broken away to show how a self-extinguishing blanket, constructed in accordance with one embodiment of the present invention, is positioned between the inner and outer skins of the fuselage and between adjacent ribs in the fuselage.

FIG. 2 is an enlarged cross section view, taken generally along the line and in the direction indicated by the arrows 2—2 in FIG. 1 showing details of a self-extinguishing blanket constructed in accordance with one embodiment of the present invention and positioned between the inner and outer skin of the walls of the fuselage and between two adjacent ribs in the fuselage of the airliner shown in FIG. 1.

FIG. 3 is an isometric view of a part of a self-extinguishing blanket constructed in accordance with one embodiment of the present invention and adapted to fit within the space defined between the inner and outer skins and the two adjacent ribs shown in FIG. 2. The cross-sectional showing of the self-extinguishing blanket in FIG. 2 is a view which is taken substantially along the line and in the direction indicated by the arrows 2—2 in FIG. 3.

FIG. 4 is a fragmentary, enlarged, cross-sectional view taken along the line and in the direction indicated by the arrows 4—4 in FIG. 3.

FIG. 5 is a fragmentary, enlarged, exploded view to show details of construction, of the self-extinguishing blanket shown in FIG. 3.

FIG. 6 is a cross-section view through a self-extinguishing blanket, constructed in accordance with one embodiment of the present invention, and showing how one film, at an area of attachment to the layer of glass fiber strands, has sufficient adhesion to the glass fiber strands to break and to pull away parts of the adhered glass fiber strands when the film is pulled back from the glass fiber strands.

FIG. 7 is an isometric view and shows, like FIG. 6, how the film is attached securely enough to the glass fiber strands at the localized areas of attachment to cause breakage and pull back of parts of the associated glass fiber strands when the film is pulled back.

Figure 1:
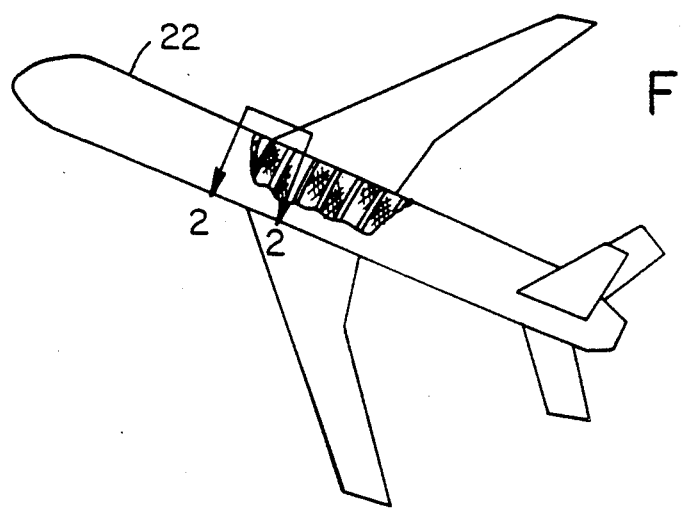

FIG. 8 is an isometric view of an airliner, like the airliner in FIG. 1, illustrating how, in the event of a crash, a part of the outer skin of the fuselage may be ripped or torn away. FIG. 8 shows how the underlying blanket may be exposed directly to a flame or to the heat developed by adjacent flames resulting from aircraft engine fuel spilled during the crash.

FIG. 9 is a fragmentary, isometric view of a self-extinguishing blanket constructed in accordance with the present invention and showing the blanket after it has been subjected to a burn test conducted in accordance with the specifications of FAR 25.853b.

FIG. 10 is an fragmentary, enlarged, plan view of the portion of the self-extinguishing blanket shown encircled by the arrows 10—10 in FIG. 9. FIG. 10 shows how the plastic film softens, pulls apart and shrinks and pulls back sufficiently far from the area exposed to the flame or to the heat of the flame so as to prevent heating of the plastic film to the ignition temperature. The shrinking away and curling back of the plastic film moves the plastic film far enough away from the heat generated by the flame so as prevent heating of any part of the plastic film to the ignition temperature. This removes combustibles from the heat source and leaves only the non-flammable glass fibers of the insulation layer of the blanket exposed to the heat of the flame.

DETAILED DESCRIPTION OF PREFERRED EMBODIMENTS

A self-extinguishing blanket constructed in accordance with one embodiment of the present invention is indicated generally by the reference numeral 21 in the various views of the drawings.

One application for the self-extinguishing blanket of the present invention is as an insulation blanket for use between the inner and outer skins of an airliner 22 shown in FIG. 1.

Figure 3:
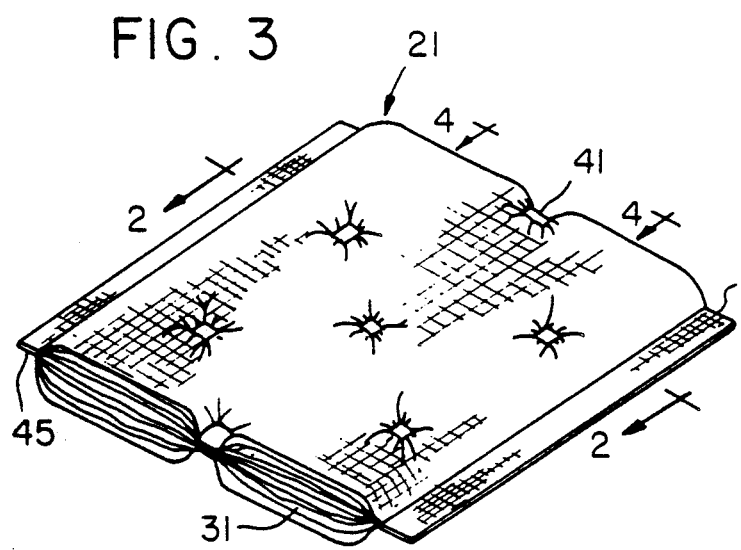
Figure 2:
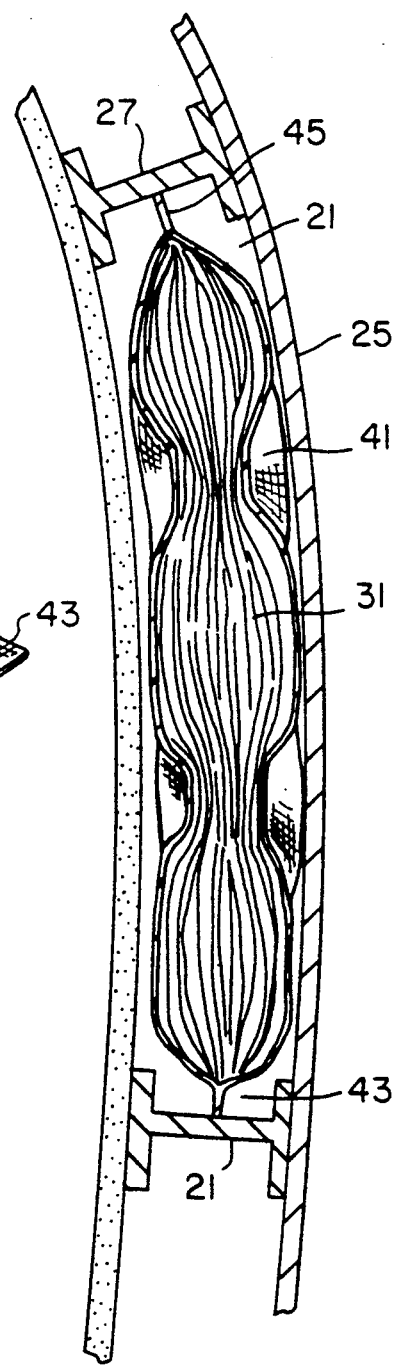

FIG. 2 shows how a blanket package which embodies a self-extinguishing blanket sandwich product (constructed in accordance with one embodiment of the present invention and shown in FIG. 3) is placed between the inner skin 23 and the outer skin 25 of the airliner.

The blanket package is also located between adjacent ribs 27 and 29 which extend circumferentially around the fuselage of the aircraft 22 shown in FIG. 1.

The blanket package shown in FIGS. 2 and 3 is sewn together along peripheral edges 43 and 45 so as to be pre-configured to fit within the space defined between the inner and the outer skins and the two adjacent ribs shown in FIG. 2.

As best illustrated in FIGS. 4 and 5, the blanket 21 has an inner layer 31 of glass fiber strands. These are air spaces within the layer which provide the insulation against the transfer of heat across the layer.

In order to preserve the insulation properties of the layer 31, moisture must be kept out of air spaces in the layer. If moisture, e.g. water condensing on the inside of the metal outer skin of the airliner, should get into the air spaces within the layer 31, the heat insulation properties can be substantially reduced.

It is therefore necessary to provide a moisture barrier on each of the side surfaces of the layer 31. The moisture barrier is usually provided in the form of a plastic film. The film is made as thin as possible in order to minimize weight. Because the plastic film is quite thin, strand reinforcement is usually added to the film to prevent or to reduce the amount of damage which can result from puncture or tears in the film.

As illustrated in FIGS. 4 and 5, each side surface of the layer 31 is covered by a reinforced film structure which includes a plastic film 33. The film is reinforced by a non woven fabric made up of warp strands 35 and fill strands 37.

In one specific embodiment of the present invention, the fill strands 37 are coated with a thermoplastic adhesive which adheres both the fill strands 37 and the underlying warp strands 35 to the plastic sheet 33.

In this embodiment the thermoplastic adhesive on the fill strands 37 is also used to attach the strand reinforced plastic sheets 33 to the insulating layer 31 of glass fibers. Because the adhesive on the fill strands 37 is a thermoplastic adhesive, it can be remelted and made tacky by the application of heat. Reheating parts of the existing thermoplastic adhesive on the fill strands 37 by applying a heating iron to selected areas 41 of each plastic sheet 31, attaches the strand reinforced plastic films 33 to the insulating layer 31. When heat is applied from the iron through the film 31 and to the thermoplastic adhesive on the underlying film strands 37, the thermoplastic adhesive at that location on the fill strand becomes molten and tacky. Pressing this reheated adhesive against the adjoining glass fiber strands on the insulating layer 31 attaches that part of the fill strand (and the associated plastic sheet 33) to the glass fiber strands in the insulating layer 31.

As best illustrated in FIG. 5, the areas 41 of attachment are laterally and longitudinally spaced apart so as to form only an intermittent pattern of attachment.

In one specific embodiment of the present invention a one inch square heating iron was used to develop the heat at each area 41, and the areas 41 comprised about 25 percent of the total area of the associated plastic film 33. Since the diameters of the underlying fill strands are much smaller (as will be described in more detail below with reference to specific examples) than the one inch width of the areas 41, the actual percentage of the total area of the film 33 which is attached to the layer 31 is substantially less than 25 percent. The actual percentage is in the order of 5 percent or less in this specific embodiment of the present invention.

FIGS. 6 and 7 show how the attachment formed by remelting the thermoplastic adhesive on selected parts on various ones of the fill strands is sufficient to break and to pull away parts of the glass fiber strands of the layer 31 when the film 33 is pulled back from the glass fiber strands.

The sandwiched blanket product of the present invention can be produced and transported as a bulk item (for example, a blanket product 4 feet or more in width and shipped in 100 yard or longer rolls).

The bulk product is then cut to template configurations, and the peripheral edges are stitched or otherwise connected together to provide pre-configured blanket packages which will fit into particular locations on the fuselage of an airliner.

The primary reason for providing an attachment between the film 33 and the insulating layer 31 is to produce a bulk blanket construction which will have sufficient retention of the plastic films 33 to the insulating layer 31 to prevent shifting of the films laterally or longitudinally of the insulating layer 31 during the sewing together, or other connecting together, of the peripheral edge portions as may be required to produce the selected, peripheral configurations of the pre-configured blanket packages.

It is a very important feature of the present invention that the attaching means are also sufficiently detachable so as to enable a shrinking and curling back of the plastic films 33 (and associated strand reinforcement 35 and 37) in the event some area of the blanket is exposed to a direct flame or to the heat developed by an adjacent flame. The shrinking and curl back of the plastic film prevent both ignition of the plastic film and propagation of the flame through the plastic film, as will be described in more detail immediately below.

If the plastic films 33 are adhered too securely to the insulating layer 31, the plastic films will be held in place long enough for the plastic film to be heated to the ignition temperature, and the plastic film will then provide fuel for the flame and will propagate the flame.

With aircraft insulation blankets of this kind there is a standard flammability test for determining whether the insulation blanket passes or fails the test. The test is designated as FAR 25.853b. Procedures for the test are set forth in Appendix F under the title "Airworthiness Standards: Transport Category—Airplanes Part 25 of the FAR". The embodiments of the invention (as described above and as will also be described below in reference to specific examples) have passed this test.

The plastic film 33 of the present invention has a composition and embodies a stress condition which enables a portion of the plastic film, when subjected to a direct flame or to the heat developed by an adjacent film, to soften, to pull apart, and to shrink and to curl back and to continue to curl back sufficiently far so as to prevent heating of any portion of the plastic film to the ignition temperature.

The strand reinforcement (the warp strands 35 and the fill strands 37) also have a composition and embody a stress condition so as to be also effective to shrink and curl back under the application of heat from a flame.

FIG. 8 illustrates a condition in which an airliner has been involved in an accident or a crash. A part of the outer skin 25 has been torn off, as illustrated in FIG. 8; and this exposes the underlying blanket 21.

FIG. 8 also shows flames 49 which can result from spills of engine fuel resulting from a crash.

FIGS. 9 and 10 show how the self-extinguishing blanket constructed in accordance with the present invention functions to prevent propagation of flame through the blanket or by means of the blanket structure.

As shown in FIGS. 9 and 10, the direct flame or the heat of the flame has impinged on the darkened area 51 of the insulating layer 31 of glass fiber strands. The glass fiber strands themselves will not burn, because the glass fiber strands do not contain any fuel for supporting combustion. These glass fiber strands therefore just become blackened and perhaps, to a certain extent, fused together by the heat of the flame.

The plastic film 33 has softened, pulled apart, shrunk, and curled back (as indicated by the curled edge 53 shown in FIGS. 9 and 10) sufficiently far away from the area 51 so as to prevent heating of any part of the plastic film to the ignition temperature.

This action occurs in a way which provides a rapid removal of a blanket fuel source (the film, associated strand reinforcement and/or adhesive) from the heat of the flame.

This curl back occurs in the present invention because of the nature of the stresses existing in the film 33 and in the reinforcement provided by the warp strands 35 and the fill strands 37 and also because of the limited strength of attachment provided by the areas 41.

The embodiments of the self-extinguishing blanket disclosed in the preceding description and shown in the drawings of this application are further illustrated through the following examples. These examples, while illustrating preferred embodiments of the self-extinguishing blanket, are not to be considered a limitation, it being understood that many variations and modifications, when employed by those skilled in the art, may be practiced without departing from the spirit and scope of the present invention as defined by the claims.

EXAMPLE 1

This example is described with references to FIGS. 2-7, 9 and 10 above and with the structure and components identified as follows:

The insulation layer 31 is a Johns Manville Microlight AA insulation.

The films 33 are 0.5 mil thickness metalized Tedlar brand films (a PVF film sold by The DuPont Company, polymer products department, as its specification TD-2,rev. 4-82). This film has orientation stresses locked in during film expansion. A particular oriented Tedlar brand film is designated as 50AL20FM by the manufacturer, The DuPont Company.

The warps strands 35 are Nylon brand warp strands having 16 ends per inch and fill strands having 16 ends per inch.

The fill strands are 70 denier Nylon brand strands.

The thermoplastic adhesive on the fill strands 37 is a Tycel brand adhesive sold by the Lord Corporation/Chemical Products Group under Specification DS10-7900A.

The strand reinforced film product (33, 35, 37) is sold by the Orcon Corporation as Orcon AN-16 specification.

Each of the areas 41 is formed by using a one inch square heating iron. The total of these areas 41 is 25 percent of the total area of the related plastic sheet 33.

EXAMPLE 2

The components of Example 1 were again repeated except as follows:

The film 33 is a 0.25 mil metalized Mylar brand (polyester) film sold by The DuPont Company under Specification Bulletin M-2d.

EXAMPLE 3

The components of Example 1 were again repeated except for the following:

The plastic film 33 is an oriented polypropylene film sold by Quantum Performancy Films, as grade 440CW.

This polypropylene film has the advantage of surpassing Mylar brand film and Tedlar brand films in cost and physical performance.

Each of the examples described in Examples 1-4 above were subjected to FAR25.853b and each example passed.

While we have illustrated and described the preferred embodiments of our invention, it is to be understood that these are capable of variation and modification and we therefore do not wish to be limited to the precise details set forth, but desire to avail ourselves of such changes and alterations as fall within the purview of the following claims.

We claim:

1. A self-extinguishing blanket of the kind which is positioned between the inner and outer skin of the fuselage of an airliner and which incorporates a heat insulating layer of glass fiber strands sandwiched between two outer strand reinforced plastic films and which is constructed to enable the plastic film, when subjected to a direct flame or to the heat developed by an adjacent flame, to soften, to pull apart and to shrink and to curl back sufficiently far so as to prevent heating of that portion of the plastic film to the ignition temperature, said self extinguishing blanket comprising, a layer of glass fiber strands constructed to include air spaced within the layer for providing insulation against the transfer of heat across the layer, said layer having first and second outer surfaces on opposed sides of the layer, first and second thin, light weight, stress stretched, plastic film means adjacent to and extending continuously along the related first and second outer surfaces of the layer for keeping moisture out of the layer to thereby maintain the insulation properties of the layer, light weight bi-directional strand reinforcement means attached to each plastic film means for adding strength to the plastic film means and for limiting punctures, tears or rips in the plastic film means while minimizing overall blanket weight, attaching means on the strand reinforcement means for attaching each plastic film means to an associated outer surface of the layer with sufficient retention to prevent shifting of the film means laterally and longitudinally of the layer during the sewing together, or other connecting together, of peripheral edge portions of the sandwiched outer plastic film means and inner layer as required to produce a selected, peripheral configuration of a blanket package, said plastic film means having a composition and embodying a stress condition which enables a portion of the plastic film means, when subjected to a direct flame or to the heat developed by an adjacent flame, to soften, to pull apart, and to shrink and curl back sufficiently far so as to prevent heating of the plastic film means to the ignition temperature, said attaching means being sufficiently detachable to enable the shrinking and curling back of the plastic film means to the extent required to avoid heating of the plastic film means to the ignition temperature, said attaching means comprising a plurality of non-contiguous, longitudinally and laterally spaced apart areas of a thermoplastic adhesive attachment between the strand reinforcement means and the layer of glass fiber strands with each individual area of thermoplastic adhesive attachment being relatively small so as to permit said detachment of the strand reinforcement film means from the glass fiber strands upon exposure to the heat of a flame, whereby the blanket leaves only the non-flammable layer of glass fiber strands exposed to the direct flame or to the heat developed by an adjacent flame and whereby the shrinking and curl back of the plastic film means prevent both ignition of the plastic film means and propagation of the flame through the plastic film means.

2. The invention defined in claim 1 wherein the plastic film means include a plastic film sheet which embodies orientation stresses locked in during film expansion in the course of manufacture of the film sheet.

3. The invention defined in claim 2 wherein the plastic film means include a crosslinked, crystalline thermoplastic film sheet which remelts upon the application of heat.

4. The invention defined in claim 2 wherein strand reinforcement means have a composition and embody a stress condition so as to be also effective to shrink and curl back under the application of heat from a flame.

5. The invention defined in claim 4 wherein the strand reinforcement means incorporate oriented, tensioned, spaced apart warp strands and oriented, tensioned spaced apart fill strands.

6. The invention defined in claim 5 wherein the strand reinforcement incorporate a thermoplastic adhesive on the fill strands and wherein the thermoplastic adhesive on the fill strands provides the attaching means for attaching the plastic film means to the associated outer surface of the layer of glass fibers.

7. The invention defined in claim 6 wherein only selected ones of the fill strands are attached to the layer of glass fibers.

8. The invention defined in claim 7 wherein said selected ones of the fill strands are attached to the glass fibers only at intermittent portions along the lengths of said selected fill strands.

9. The invention defined in claim 1 wherein the area of said areas of thermoplastic adhesive attachment comprise less than 25 percent of the total area of the related plastic film means.

* * * * *